United States Patent
Yang et al.

(10) Patent No.: US 8,537,326 B2
(45) Date of Patent: Sep. 17, 2013

(54) LIQUID CRYSTAL COMPOSITION, DEVICE AND METHOD THEREOF

(75) Inventors: Deng-Ke Yang, Hudson, OH (US); Young Cheol Yang, Cuyahoga Falls, OH (US); Rui Bao, Wuhan (CN)

(73) Assignee: Kent State University, Kent, OH (US)

( * ) Notice: Subject to any disclaimer, the term of this patent is extended or adjusted under 35 U.S.C. 154(b) by 400 days.

(21) Appl. No.: 12/779,293

(22) Filed: May 13, 2010

(65) Prior Publication Data

US 2010/0289999 A1 Nov. 18, 2010

Related U.S. Application Data

(60) Provisional application No. 61/178,245, filed on May 14, 2009.

(51) Int. Cl.
*C09K 19/02* (2006.01)
(52) U.S. Cl.
USPC .......................................... 349/183; 349/182
(58) Field of Classification Search
USPC .................................................. 349/182, 183
See application file for complete search history.

(56) References Cited

U.S. PATENT DOCUMENTS

| | | | | |
|---|---|---|---|---|
| 4,896,292 A * | 1/1990 | Eich et al. | | 365/108 |
| 6,117,385 A * | 9/2000 | Chartoff et al. | | 264/401 |
| 6,423,260 B1 * | 7/2002 | Chartoff et al. | | 264/401 |
| 6,940,801 B1 * | 9/2005 | Ishii et al. | | 369/112.01 |
| 7,474,373 B2 * | 1/2009 | Miyachi et al. | | 349/129 |
| 7,616,280 B2 * | 11/2009 | Miyachi et al. | | 349/129 |
| 7,628,935 B2 * | 12/2009 | Naciri et al. | | 252/299.01 |
| 8,045,117 B2 * | 10/2011 | Miyachi et al. | | 349/141 |
| 8,111,358 B2 * | 2/2012 | Shibahara | | 349/96 |
| 8,120,746 B2 * | 2/2012 | Shibahara et al. | | 349/169 |
| 2005/0041196 A1 * | 2/2005 | Ishihara et al. | | 349/181 |
| 2005/0151912 A1 * | 7/2005 | Miyachi et al. | | 349/141 |
| 2007/0070282 A1 * | 3/2007 | Shibahara et al. | | 349/141 |
| 2007/0108407 A1 * | 5/2007 | Naciri et al. | | 252/299.01 |
| 2009/0086115 A1 * | 4/2009 | Miyachi et al. | | 349/33 |
| 2010/0014040 A1 * | 1/2010 | Miyachi et al. | | 349/139 |
| 2010/0039589 A1 * | 2/2010 | Shibahara | | 349/96 |
| 2011/0080553 A1 * | 4/2011 | Sun | | 349/184 |

* cited by examiner

*Primary Examiner* — Kaveh Kianni
(74) *Attorney, Agent, or Firm* — Fay Sharpe LLP (57) ABSTRACT

The invention provides a liquid crystal (LC) composition, a LC device such as a liquid crystal display and a phase modulator, and a method thereof. The liquid crystal composition comprises a liquid crystal and a polymer. The liquid crystal exhibits a macroscopic anisotropic property such as optical property in the absence of the polymer under a condition such as certain temperature. The polymer in the composition stabilizes the liquid crystal so that the liquid crystal exhibits a macroscopic isotropic property under the same condition, and the liquid crystal stabilized by the polymer exhibits the macroscopic anisotropic property when an electrical field is applied thereon. The devices exhibit technical merits such as large viewing angle, fast response time, better contrast ratio, easy manufacturability of large size display with improved dark state, easy manufacturing process with wider temperature region, and polarization-insensitivity of PSI phase modulator, among others.

23 Claims, 6 Drawing Sheets

LIQUID CRYSTAL COMPOSITION, DEVICE AND METHOD THEREOF

This application claims priority based on the U.S. Provisional Application 61/178,245 filed on May 14, 2009, which is incorporated herein by reference in its entirety.

FIELD OF THE INVENTION

The present invention relates to a liquid crystal (LC) composition, a LC device, and a method of making the same. The invention finds particular application in conjunction with e.g. polymer stabilized isotropic LC, a liquid crystal display and a phase modulator, and will be described with particular reference thereto. However, it is to be appreciated that the present invention has further application in related technology areas as will be understood by those skilled in the relevant field of technology.

BACKGROUND OF THE INVENTION

Liquid crystal displays (LCDs) are dominant in the flat panel display market, accounting for more than 100 billion US dollars annually. State-of-the-art LCDs in large volume production use optical anisotropic, or birefringent, liquid crystals. They are operated between a bright and a dark state, or in any state between these states. In both the bright and dark states, the liquid crystal material is optically anisotropic but the optical axes are in different directions. One of the major problems with the LCDs is that in the dark state the liquid crystal material is in the anisotropic state. In this state, there is residual optical retardation at the off-axis viewing angles, causing light leakage at these viewing angles. The light leakage severely limits the viewing angle and contrast ratio of the LCDs.

A more recent LCD is the polymer stabilized blue phase (PB) LCD. In the PB-LCD dark state, the liquid crystal material is in the optical isotropic blue phase. This LCD experiences no residual optical retardation at off-axis viewing angles, and therefore the PB-LCD has a good viewing angle. Nonetheless, the PB-LCD exhibits continuing problems. One such problem is that the blue phases are exhibited by chiral liquid crystals. Without dispersed polymers, the blue phases usually exist in a very narrow temperature region, around 1 degree or less. In order to use the blue phases in display applications, polymer stabilization is employed to widen the temperature of the blue phase. The polymer stabilization is achieved by mixing the liquid crystal with a small amount of monomer (or oligomer) and polymerizing the monomer in the blue phase. During the polymerization, the temperature must be precisely controlled so that the mixture is in the blue phase. This is a problem in manufacturing PB-LCD. The blue phase possesses a cubic structure. It is difficult to manufacture large size display with uniform optical state. This is another problem in manufacturing PB-LCD.

Advantageously, the present invention overcomes the foregoing problems by providing polymer stabilized isotropic (PSI) liquid crystals. These PSI liquid crystals can be used for displays and as phase modulators, and exhibit many technical merits, such as providing a large viewing angle, fast response time, and enhanced contrast ratio. In addition, the PSI liquid crystals of the present invention are easy to manufacture as large size displays, such displays exhibiting improved dark state. Further, they are amenable to an easy manufacturing process having a wider temperature range. Finally, the PSI phase modulator of the present invention exhibits polarization-insensitivity. These attributes, among others, are found in the PSI liquid crystals according to the present invention.

BRIEF DESCRIPTION OF THE INVENTION

One aspect of the invention provides a liquid crystal composition comprising a liquid crystal and a polymer, wherein the liquid crystal exhibits a macroscopic anisotropic property in the absence of the polymer under a condition, and the polymer stabilizes the liquid crystal so that the liquid crystal exhibits a macroscopic isotropic property under the same condition.

Another aspect of the invention provides a liquid crystal composition comprising a liquid crystal and a polymer, wherein the liquid crystal exhibits a macroscopic anisotropic property in the absence of the polymer under a condition, the polymer stabilizes the liquid crystal so that the liquid crystal exhibits a macroscopic isotropic property under the same condition, and the liquid crystal stabilized by the polymer exhibits the macroscopic anisotropic property when an electrical field is applied thereon.

Still another aspect of the invention provides a liquid crystal device comprising a cell, wherein the cell comprises a liquid crystal composition which comprises a liquid crystal and a polymer, wherein the liquid crystal exhibits a macroscopic anisotropic property in the absence of the polymer under a condition, the polymer stabilizes the liquid crystal so that the liquid crystal exhibits a macroscopic isotropic property under the same condition, and the liquid crystal stabilized by the polymer exhibits the macroscopic anisotropic property when an electrical field is applied thereon.

A further aspect of the invention provides a method of modifying the property of a liquid crystal comprising: (i) providing a liquid crystal that alone exhibits a macroscopic anisotropic property under a condition; and (ii) combining the liquid crystal with a polymer; wherein the polymer stabilizes the liquid crystal so that the liquid crystal exhibits a macroscopic isotropic property under the same condition, and the liquid crystal stabilized by the polymer exhibits the macroscopic anisotropic property when an electrical field is applied thereon.

DETAILED DESCRIPTION OF THE INVENTION

In various embodiments, the liquid crystal composition of the invention comprises a liquid crystal and a polymer. The liquid crystal exhibits a macroscopic anisotropic property in the absence of the polymer and under a condition such as a temperature in the range of from about 0° C. to about 200° C. The polymer can stabilize the liquid crystal so that the liquid crystal exhibits a macroscopic isotropic property under the same condition such as the temperature in the range of from about 0° C. to about 200° C. It should be understood that the term "condition" used in this specification includes any condition which affects the liquid crystal's physical, chemical, optical, and electrical properties, except that it does not include an electrical field.

In various embodiments, the liquid crystal stabilized by the polymer exhibits a macroscopic anisotropic property when an electrical field is applied thereon.

Although there is no specific limitation on the macroscopic anisotropic property and the macroscopic isotropic property, in typical embodiments they are both an optical property.

Examples of the liquid crystal that can be used in the liquid crystal composition of the invention include, but are not limited to, chiral or achiral LCs; liquid crystals with positive dielectric anisotropy in the absence of the polymer; and liquid crystals in the anisotropic liquid crystal state, such as nematic, cholesteric, and smectic phases, when in the absence of the polymer.

In exemplified embodiments, the liquid crystal is selected from a nematic liquid crystal such as E31 LV, E49, BL036, TL203, or any mixture thereof. E31 LV, E49, BL036, and TL203 are commercially available from EM Industries, Inc., and their molecules comprise rigid phenyl ring(s) and/or cyclohexane ring(s), flexible hydrocarbon tail(s) and polar group(s).

The liquid crystal composition of the invention may further comprise any suitable additional ingredient, such as a chiral dopant. Examples of suitable chiral dopants include but are not limited to R811, S811, R1011, CB15, and any mixture thereof. R811, S811, R1011, and CB15 are all commercially available from EM Industries, Inc.

more cells, wherein at least one of the cells comprises a liquid crystal composition. The composition comprises a liquid crystal and a polymer, wherein the liquid crystal exhibits an anisotropic property in the absence of the polymer under a condition such as the operation temperature of the device, and the polymer stabilizes the liquid crystal so that the liquid crystal exhibits a macroscopic isotropic property under the same condition. Typically, the liquid crystal stabilized by the polymer exhibits a macroscopic anisotropic property under an electrical field. For example, the macroscopic anisotropic property and the macroscopic isotropic property may both be an optical property. A liquid crystal display is a device that can show arbitrary pictures. A phase modulator is a device that can vary the optical length.

In some exemplary embodiments, the cell comprises two substrates with transparent electrodes. The transparent electrodes are thin electric conducting layers coating on glass or plastic substrates, one example of which is ITO (Indium Tin oxide).

A liquid crystal display of the invention may have a viewing angle in the range of from about −60° to about 60°, and a response time shorter than 1 ms. The response time means the time intervals of the transmittance changes from low to high and from high to low when a voltage is turned on or turned off. When no electric field is applied, the display may have a low transmittance, such as lower than 1%. When an electric field is applied, the display may have a high transmittance, such as greater than 5%. The intensity of the electric field may range from about 0 V/micron to about 20 V/micron, and preferably range from about 2 V/micron to about 10 V/micron.

When no electric field is applied, a phase modulator of the invention may have a polarization-insensitivity with an optical retardation value in a range such as from about 0 micron to about +/−1.0 micron. Such a phase modulator may have a polarization-insensitivity with a second optical retardation value in a range such as from about +/−0.00001 micron to about +/−5 micron when an electric field is applied. The polarization-insensitivity is used to characterize that the optical phase change when light propagates through the device is independent of the polarization of the incident light.

The liquid crystal composition of the invention may further comprise any suitable additional ingredient such as a chiral dopant. Examples of the chiral dopant may be selected from R811, S811, R1011, CB15, and any mixture thereof. R811, S811, R1011, and CB15 are all commercially available from EM Industries, Inc.

In embodiments, the liquid crystal and the polymer in the composition of the invention may have a weight ratio generally in the range of from about 100:1 to about 1:1, preferably in the range of from about 20:1 to about 2:1, and more preferably in the range of from about 10:1 to about 3:1.

The invention also provides a liquid crystal device, such as a liquid crystal display or a phase modulator, including one or The invention provides a method of modifying the property of a liquid crystal comprising:

(i) providing a liquid crystal that alone exhibits a macroscopic anisotropic property such as an optical property under a condition; and (ii) combining the liquid crystal with a polymer;

wherein the polymer stabilizes the liquid crystal so that the liquid crystal exhibits a macroscopic isotropic property such as an optical property under the same condition.

The method of the invention may further include a step of applying an electrical field to the liquid crystal stabilized by the polymer so that the liquid crystal exhibits a macroscopic anisotropic property.

According to the invention, one process for combining the liquid crystal with the polymer comprises:

(a) mixing the liquid crystal with monomers and/or oligomers at a first temperature, wherein the liquid crystal exhibits an anisotropic property at the first temperature;

(b) heating the mixture from step (a) to a second temperature, wherein the liquid crystal alone exhibits an isotropic property at the second temperature; and (c) polymerizing the monomers and/or oligomers into a polymer at the second temperature;

wherein the polymer stabilizes the liquid crystal so that the liquid crystal exhibits a macroscopic isotropic property at the first temperature.

Polymerizing the monomers and/or oligomers into the polymer may be accomplished by free radical polymerization, cationic polymerization, anionic polymerization, and photo-polymerization, among others.

In an embodiment, a chiral or achiral liquid crystal is mixed with monomers and/or oligomers. In either case, the liquid crystal has a positive dielectric anisotropy and tends to be aligned parallel to an applied electric field. In this embodiment, the LC/polymer mixture is filled into the display or modulator cell, which generally consists of two substrates with transparent electrodes. Once filled, the cell is heated to an elevated temperature such that the mixture is in the isotropic phase. Under the heated condition, the monomers (oligomers) are polymerized in the isotropic phase to form an isotropic polymer network. When the cell is cooled to the operation temperature of the display, the liquid crystal retains the isotropic state, rendering a cell substantially in the macroscopic isotropic optical state.

Without the intention to be bound by any particular theory, it is believed that, on the sub-micron or smaller scale, the liquid crystal may be in an anisotropic liquid crystal state, i.e., in a nematic, cholesteric or smectic phase. When light propagates through the material at any angle with respect to the cell normal, the net optical retardation of the material is substantially zero. The material also has a very small scattering effect on the light, and further does not change the polarization of the light. When an electric field is applied to the material, the liquid crystal molecules are tilted toward the field direction.

Example 1

Polymer Stabilized Isotropic Liquid Crystal Display

Figure 1:
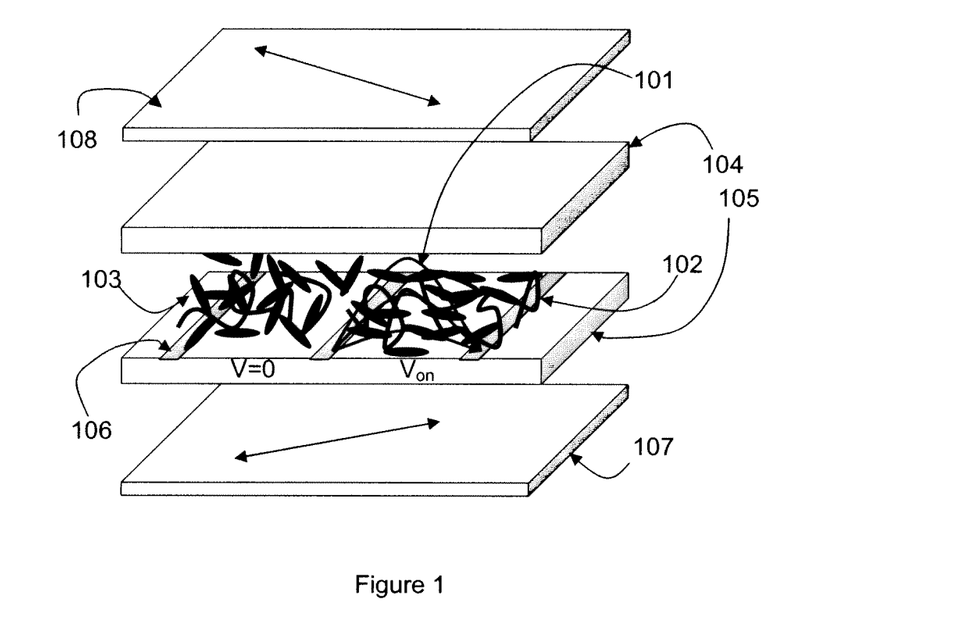
FIG. 1 schematically illustrates the basic structure of a polymer stabilized isotropic liquid crystal display in an embodiment of the invention.

FIG. 1 schematically illustrates the basic structure of a polymer stabilized isotropic liquid crystal display. With reference to FIG. 1, a composition including a polymer network 102 and macroscopic isotropic liquid crystals 103 stabilized by network 102 is shown. The composition is sandwiched between two substrates 104 and 105. On one of the substrates such as substrate 105 there are inter-digitated electrodes 106, as in an in-plane-switch (IPS) display or a bump display, through which electrical field with field direction 101 can be applied to the material. The transmission axes (denoted as two-way straight arrows) of the polarizer 107 and analyzer 108 (as shown on 107 and 108) are orthogonal to each other. The electrodes make the angle about 45° with respect to the transmission axes of the polarizer and analyzer. In a pixel where no voltage is applied, the liquid crystal is in a random orientation state. When linearly polarized light goes through it, the polarization state does not change, because the material is optically isotropic. The light is absorbed by the analyzer, and the pixel is dark. In contrast, in the same pixel where voltage is applied, the liquid crystal is tilted toward the electric field direction and therefore exhibits birefringence. When linearly polarized light goes through it, the polarization is rotated toward the transmission axis of the analyzer. The light passes the analyzer and the pixel is bright.

Example 2

Electro-Optical Properties of a LC Display Using a PSI LC Formulation

Figure 2:
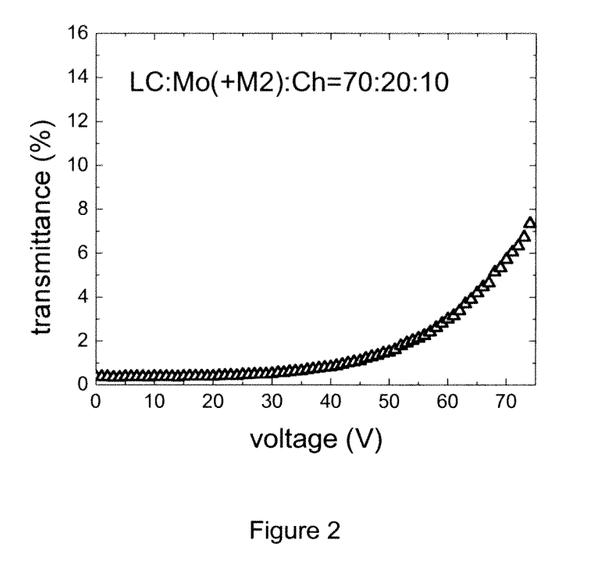
FIG. 2 shows the transmittance of a cell containing PSI LC prepared from a mixture of nematic LC, monomers and a chiral dopant in the weight ratio of 70:20:10 as a function of applied electrical filed in an embodiment of the invention.

Nematic liquid crystal E31LV (68%), Monomer RM 25 (20%), Chiral dopant R811 (10%) and photo-initiator BME from Polyscience Inc. (2%) were mixed. The mixture was filled into an IPS cell with a thickness of 4 microns. The width of the electrode was also 4 microns, and the distance between any two consecutive electrodes was 10 microns. Once filled, the cell was heated to 100° C. and the monomer was photo-polymerized for 30 minutes. After curing, the electro-optical properties of the cell were measured at room temperature (22° C.) by standard electro-optical equipment. FIG. 2 shows the transmittance of the cell containing PSI LC as a function of the applied electrical filed. The legend "LC:Mo(+M2):Ch=70:20:10" in FIG. 2 denotes that the PSI LC was prepared from a mixture of the nematic LC, the monomers and the chiral dopant, in the weight ratio of 70:20:10.

Example 3

Electro-Optical Properties of a LC Display Using a PSI LC Formulation

Figure 3:
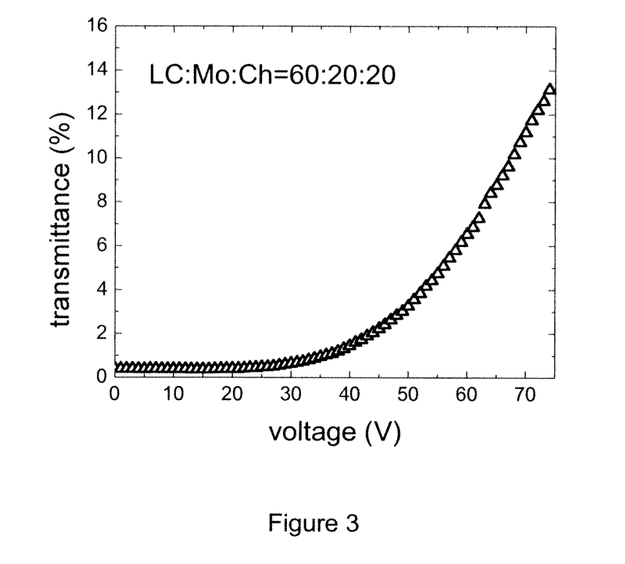
FIG. 3 shows the transmittance of a cell containing PSI LC prepared from a mixture of nematic LC, monomers and a chiral dopant in the weight ratio of 60:20:20 as a function of applied electrical filed in an embodiment of the invention.

Similar to Example 2, nematic liquid crystal E31 LV (58%), Monomer RM 257 (20%), Chiral dopant R811 (20%) and photo-initiator BME (2%) were mixed. The mixture was filled into an IPS cell with a thickness of 4 microns. The width of the electrode was 4 microns and the distance between any two consecutive electrodes was 10 microns. The cell was heated to 100° C. and the monomer was photo-polymerized for 30 minutes. After curing the electro-optical properties of the cell were measured at room temperature (22° C.) by standard electro-optical equipment. FIG. 3 shows the transmittance of the cell containing PSI LC as a function of the applied electrical filed. The legend "LC:Mo(+M2):Ch=60:20:20" in FIG. 3 denotes that the PSI LC was prepared from a mixture of the nematic LC, the monomers and the chiral dopant, in the weight ratio of 60:20:20.

Example 4

Electro-Optical Properties of a LC Display Using a PSI LC Formulation

Figure 4:
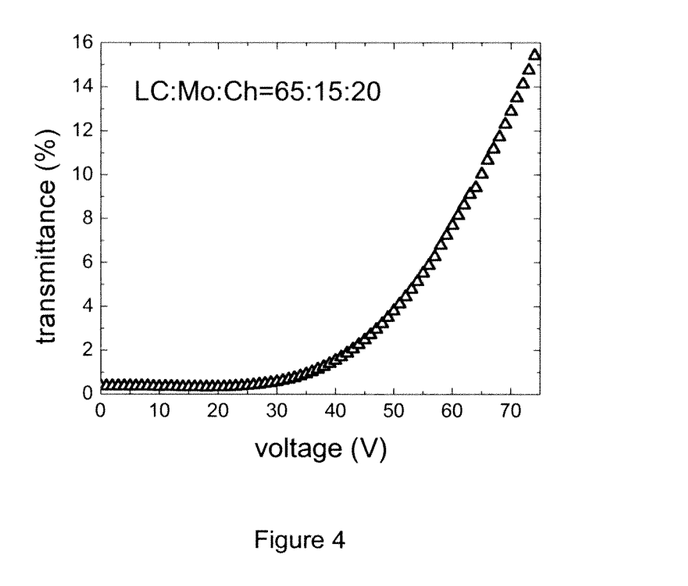
FIG. 4 shows the transmittance of a cell containing PSI LC prepared from a mixture of nematic LC, monomers and a chiral dopant in the weight ratio of 65:15:20 as a function of applied electrical filed in an embodiment of the invention.

Similar to Example 2, nematic liquid crystal E31LV (63.5%), Monomer RM 257 (15%), Chiral dopant R811 (20%) and photo-initiator BME (1.5%) were mixed. The mixture was filled into an IPS cell with a thickness of 4 microns. The width of the electrode was 4 microns and the distance between any two consecutive electrodes was 10 microns. The cell was heated to 100° C. and the monomer was photo-polymerized for 30 minutes. After curing, the electro-optical properties of the cell were measured at room temperature (22° C.) by standard electro-optical equipment. FIG. 4 shows the transmittance of the cell containing PSI LC as a function of the applied electrical filed. The legend "LC:Mo(+M2):Ch=65:15:20" in FIG. 4 denotes that the PSI LC was prepared from a mixture of the nematic LC, the monomers and the chiral dopant, in the weight ratio of 65:15:20.

Example 5

Electro-Optical Properties of a LC Display Using a PSI LC Formulation

Figure 5:
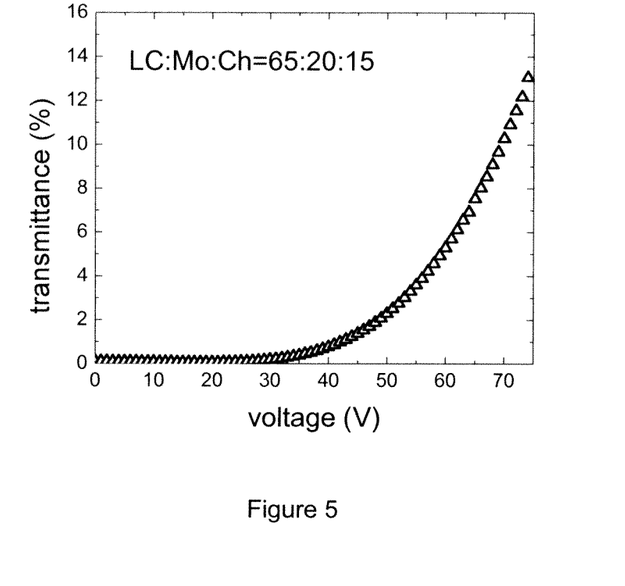
FIG. 5 shows the transmittance of a cell containing PSI LC prepared from a mixture of nematic LC, monomers and a chiral dopant in the weight ratio of 65:20:15 as a function of applied electrical filed in an embodiment of the invention.

Similar to Example 2, nematic liquid crystal E31LV (63%), monomer RM 257 (20%), chiral dopant R811 (15%) and photo-initiator BME (2%) were mixed. The mixture was filled into an IPS cell with a thickness of 4 microns. The width of the electrode was 4 microns and the distance between any two consecutive electrodes was 10 microns. The cell was heated to 100° C. and the monomer was photo-polymerized for 30 minutes. After curing, the electro-optical properties of the cell were measured at room temperature (22° C.) by standard electro-optical equipment. FIG. 5 shows the transmittance of the cell containing PSI LC as a function of the applied electrical filed. The legend "LC:Mo(+M2):Ch=65:20:15" in FIG. 5 denotes that the PSI LC was prepared from a mixture of the nematic LC, the monomers and the chiral dopant, in the weight ratio of 65:20:15.

Example 6

Polymer Stabilized Isotropic Liquid Crystal Phase Modulator

Figure 6:
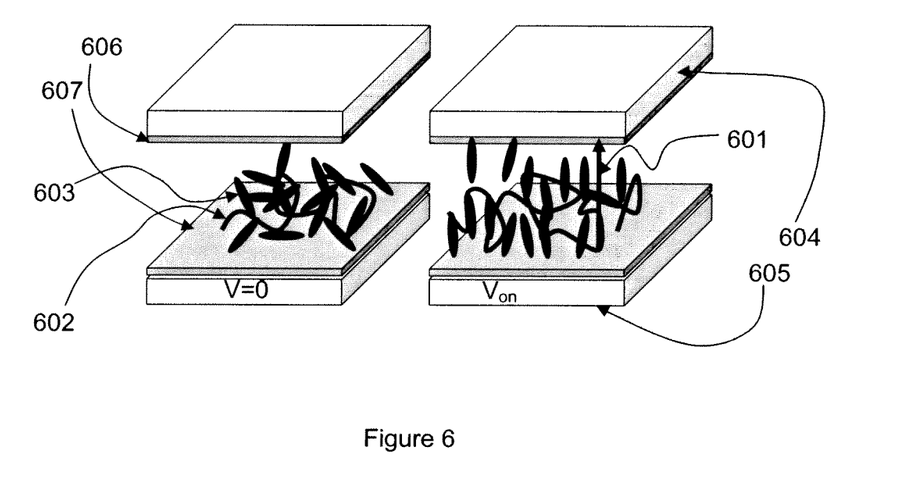
FIG. 6 schematically illustrates the basic structure of a polymer stabilized isotropic liquid crystal phase modulator in an embodiment of the invention.

The material used in this example can be prepared in the same way as for a polymer stabilized isotropic liquid crystal display. FIG. 6 schematically illustrates the basic structure of a polymer stabilized isotropic liquid crystal phase modulator. With reference to FIG. 6, a composition including a polymer network 602 and macroscopic isotropic liquid crystal 603 stabilized by network 602 is shown. The composition is sandwiched between two substrates 604 and 605. Electrodes 606 and 607 are on the inner surface of both substrates 604 and 605 and the electric field is in the cell normal direction 601. When no voltage is applied, the liquid crystal is in the random oriented state. When normal incident light goes through it, the refractive index of the material is $n_{iso}=[(n_e^2+2n_o^2)/3]^{1/2}$, where $n_e$ and $n_o$ are the extraordinary and ordinary refractive indices of the liquid crystal in the absence of the polymer, respectively. The optical phase retardation is $2\pi n_{iso}d/\lambda$, where d is the cell thickness and $\lambda$ is the wavelength of the light. When a voltage is applied across the cell, the liquid crystal is tilted toward the electric field direction, and the refractive index of the material changes to a value $n_{eff}$ which is smaller than $n_{iso}$. The optical phase retardation becomes $2\pi n_{eff}d/\lambda$. The higher the applied voltage, the smaller the effective refractive index. Therefore, by varying the applied voltage, the optical phase retardation can be modulated. For example, this material can be used to make an electrically tunable Fabry-Perot interferometer.

The invention has been described with reference to the exemplary embodiments. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A liquid crystal composition for a device comprising a liquid crystal and a polymer, wherein the liquid crystal exhibits a macroscopic anisotropic property in the absence of the polymer under a condition, the condition including temperature between 0 C and 200 C, the polymer stabilizes the liquid crystal so that the liquid crystal exhibits a macroscopic isotropic property under the same condition, the liquid crystal stabilized by the polymer exhibits the macroscopic anisotropic property when an electrical field is applied thereon, and the device is a display or a phase modulator having a polarization-insensitivity with a first optical retardation value when a first electric field is applied on the liquid crystal stabilized by the polymer.

2. The liquid crystal composition according to claim 1, in which the macroscopic anisotropic property and the macroscopic isotropic property are both an optical property.

3. The liquid crystal composition according to claim 1, in which the condition comprises temperature.

4. The liquid crystal composition according to claim 3, in which the temperature is in the range of from about 0° C. to about 100° C.

5. The liquid crystal composition according to claim 1, in which the liquid crystal is chiral or achiral.

6. The liquid crystal composition according to claim 1, in which the liquid crystal has a positive dielectric anisotropy in the absence of the polymer.

7. The liquid crystal composition according to claim 1, in which the liquid crystal in the absence of the polymer is in an anisotropic liquid crystal state such as the nematic, cholesteric, or smectic phase.

8. The liquid crystal composition according to claim 1, in which the liquid crystal is a nematic liquid crystal.

9. The liquid crystal composition according to claim 1, further comprising a chiral dopant.

10. A liquid crystal device comprising a cell, wherein the cell comprises a liquid crystal composition which comprises a liquid crystal and a polymer, wherein the liquid crystal exhibits a macroscopic anisotropic property in the absence of the polymer under a condition, the condition including temperature between 0 C and 200 C, the polymer stabilizes the liquid crystal so that the liquid crystal exhibits a macroscopic isotropic property under the same condition, the liquid crystal stabilized by the polymer exhibits the macroscopic anisotropic property when an electrical field is applied thereon, and the device is a display or a phase modulator having a polarization-insensitivity with a first optical retardation value when a first electric field is applied on the liquid crystal stabilized by the polymer.

11. The liquid crystal device according to claim 10, in which the macroscopic anisotropic property and the macroscopic isotropic property are both an optical property.

12. The liquid crystal device according to claim 10, in which the condition is the operation temperature of the device.

13. The liquid crystal device according to claim 10, in which the cell comprises two substrates with transparent electrodes.

14. The liquid crystal device according to claim 10, wherein the device is a liquid crystal display.

15. The liquid crystal device according to claim 10, wherein the device is a liquid crystal display having a viewing angle in the range of from about −60° to about 60°.

16. The liquid crystal device according to claim 10, wherein the device is a liquid crystal display having a response time shorter than 1 ms.

17. The liquid crystal device according to claim 10, wherein the device is a display with a transmittance lower than 1% when no electric field is applied on the liquid crystal stabilized by the polymer.

18. The liquid crystal device according to claim 10, wherein the device is a display with a transmittance greater than 5% when the electric field is applied on the liquid crystal stabilized by the polymer.

19. The liquid crystal device according to claim 10, wherein the display or phase modulator has a polarization-insensitivity with a second optical retardation value when a second electric field is applied on the liquid crystal stabilized by the polymer.

20. A liquid crystal composition comprising a liquid crystal and a polymer, wherein the liquid crystal exhibits a macroscopic anisotropic property in the absence of the polymer under a condition, the condition including temperature between 0 C and 200 C, the polymer stabilizes the liquid crystal so that the liquid crystal exhibits a macroscopic isotropic property under the same condition, the liquid crystal composition has a polarization insensitivity when no electric field is applied, and the polarization insensitivity has an optical retardation value between −1.0 and +1.0 micron.

21. The liquid crystal composition according to claim 20, wherein the liquid crystal composition has a polarization insensitivity when an electric field is applied.

22. The liquid crystal composition according to claim 21, wherein the polarization insensitivity has an optical retardation value between −0.00001 micron and +0.00001 micron.

23. The liquid crystal composition according to claim 21, wherein the polarization insensitivity has an optical retardation value between −5 micron and +5 micron.

* * * * *